United States Patent
Pinzauti et al.

(10) Patent No.: US 6,672,630 B2
(45) Date of Patent: Jan. 6, 2004

(54) FLANGE FOR CONNECTION BETWEEN AN AXIAL COMPRESSOR AND HIGH-PRESSURE ROTOR DISC UNIT IN A GAS TURBINE

(75) Inventors: Massimo Pinzauti, Florence (IT); Carlo Bacciottini, Poggibonsi (IT)

(73) Assignee: Nuovo Pignone Holding S.p.A., Florence (IT)

( * ) Notice: Subject to any disclaimer, the term of this patent is extended or adjusted under 35 U.S.C. 154(b) by 0 days.

(21) Appl. No.: 10/245,721

(22) Filed: Sep. 18, 2002

(65) Prior Publication Data

US 2003/0057702 A1 Mar. 27, 2003

(30) Foreign Application Priority Data

Sep. 20, 2001 (IT) ...................... MI2001A1961

(51) Int. Cl.[7] ................................. F16L 23/00
(52) U.S. Cl. ....................... 285/405; 285/416
(58) Field of Search ................ 285/382, 405, 285/416, 368; 415/219, 115

(56) References Cited

U.S. PATENT DOCUMENTS

| | | | | |
|---|---|---|---|---|
| 1,977,911 A | * | 10/1934 | Hansen | 285/405 |
| 4,074,914 A | * | 2/1978 | Novotny | 285/405 |
| 4,183,562 A | * | 1/1980 | Watkins | 285/405 |
| 4,310,286 A | * | 1/1982 | Peters et al. | 416/198 |
| 5,746,574 A | * | 5/1998 | Czachor et al. | 415/115 |
| 5,833,435 A | * | 11/1998 | Smith | 416/94 |
| 5,967,566 A | * | 10/1999 | Schlicht | 285/405 |
| 6,077,035 A | * | 6/2000 | Walters et al. | 415/115 |
| 6,499,957 B1 | * | 12/2002 | Klingels | 416/198 |
| 6,546,732 B1 | * | 4/2003 | Yonng et al. | 60/772 |

* cited by examiner

Primary Examiner—Eric K. Nicholson
(74) Attorney, Agent, or Firm—Nixon & Vanderhye

(57) ABSTRACT

A flange (20) for connection between an axial compressor and high-pressure rotor disc unit (14) in a gas turbine (10), wherein the flange (20) has a body (22) with a frusto-conical shape which is joined to a shaft (12) of the axial compressor by means of a hub (24) which has a cylindrical shape and which, at the larger base of the frustum of the cone of the body (22) is connected to the rotor disc unit (14) by means of an extension (26) of the hub in the form of a circular ring, a circumferential recess (28) provided in a surface (29) of the extension (26) which faces the rotor disc unit (14) being connected by interference with a projection, which is complementary to the recess and is provided on the rotor disc unit (14); the body (22) has an outer generatrix which is inclined relative to the direction at right-angles to the axis (X) by an angle $\alpha_1$ of between 25° and 35° and an inner generatrix which is inclined by an angle $\alpha_2$ of between 12° and 18°.

9 Claims, 2 Drawing Sheets

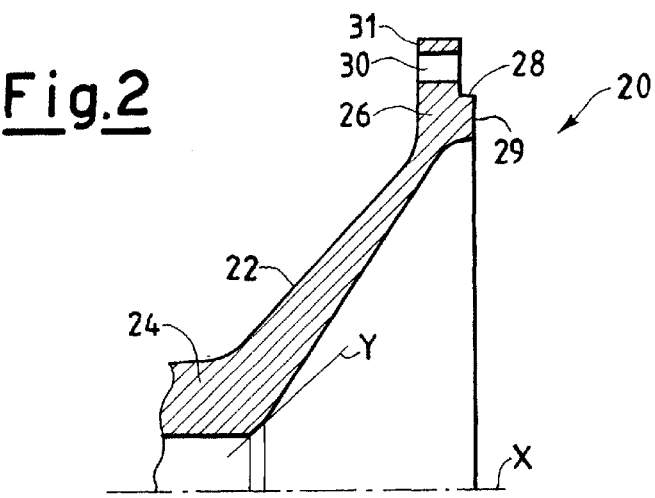
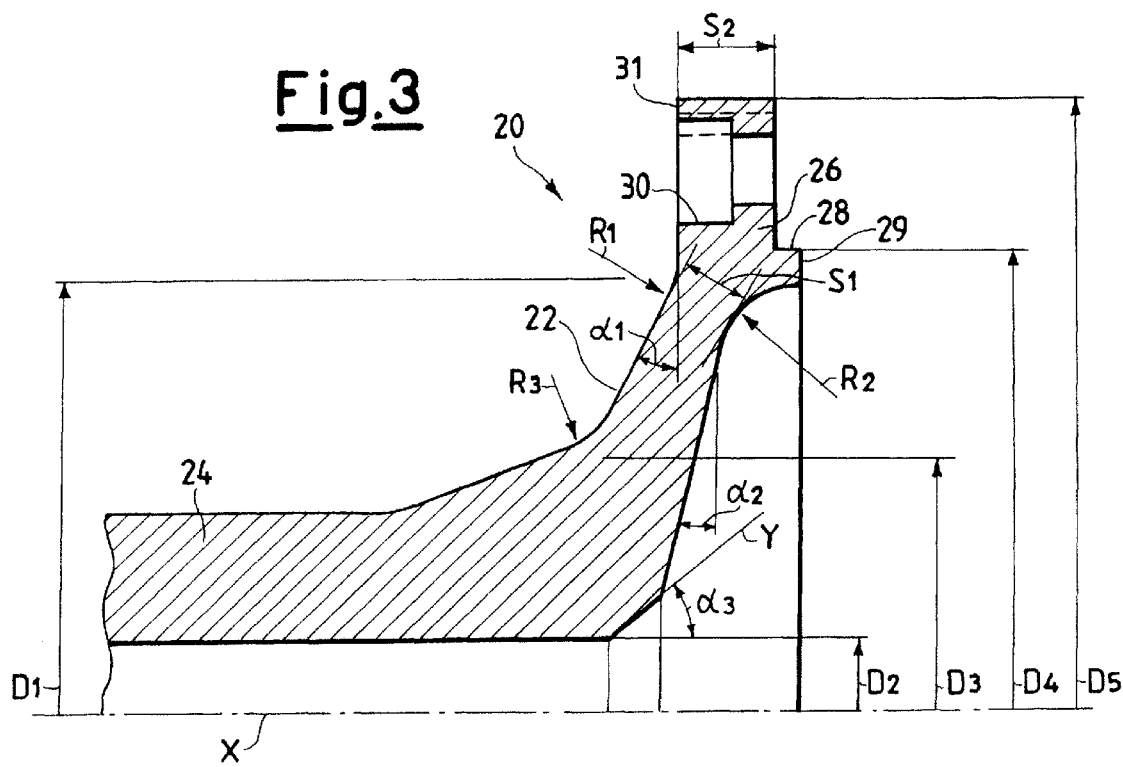

FLANGE FOR CONNECTION BETWEEN AN AXIAL COMPRESSOR AND HIGH-PRESSURE ROTOR DISC UNIT IN A GAS TURBINE

The present invention relates to an improved flange for connection between an axial compressor and high-pressure rotor disc unit in a gas turbine.

As is known, gas turbines are machines which consist of an axial compressor and a turbine with one or more stages, wherein these components are connected to each other by a rotary shaft and wherein a combustion chamber is provided between the compressor and the turbine.

The gas output from the combustion chamber, which has a high temperature and a high pressure, reaches through corresponding pipes the different stages of the turbine, which transforms the enthalpy of the gas into mechanical energy available to a user.

In turbines with two stages the gas is processed in the first stage of the turbine in temperature and pressure conditions which are very high and undergoes a first expansion there.

Then, in the second stage of the turbine it undergoes a second expansion in temperature and pressure conditions which are lower than those used in the preceding stage.

It is also known that in order to obtain the maximum performance from a specific gas turbine it is necessary for the temperature of the gas to be as high as possible.

However, the maximum temperature values which can be obtained in use of the turbine are limited by the resistance of the materials which are used at present.

It is also known that in gas turbines a flange exists for connection between the axial compressor and the high-pressure rotor disc unit of the turbine.

In particular, at present this connection flange is usually made of alloy steel for high temperatures, even when the connection is provided with high-pressure rotor disc units which are made of alloys based on nickel.

The reason for this procedure consists in the fact that the flange is advantageously produced integrally with the shaft of the axial compressor of the turbine.

A problem which is particularly significant in the present art is therefore that of guaranteeing an optimal connection between the axial compressor shaft and the high-pressure rotor disc unit, in all the conditions of functioning of the machine.

In fact it should be noted that the method of connection between the axial compressor shaft and the high-pressure rotor disc unit of the turbine represents a crucial aspect of the design of any turbine, taking into account the fact that the connection flange must withstand satisfactorily and reliably the stresses to which it is subjected without giving rise to breakages or other similar problems.

In fact it is known that this connection flange is a mechanical coupling element which must have firstly sufficient resilience, such as to permit maintenance of correct interference with the high-pressure rotor disc unit of the turbine to which it is connected, during the normal cycles of the machine; additionally at the same time the flange must be mechanically resistant, in order to guarantee the stability of the machine for the service life indicated in the specification.

Furthermore, nowadays, the trend is to obtain gas turbines with increasingly high performance levels.

This involves the fact of having to increase the speed of rotation and the compression ratios, as well as the combustion temperature.

There is consequently also an increase in the temperature of the gases which expand in the stages of the turbine.

This therefore gives rise to an increase in the stresses on the flange for connection between the axial compressor and the high-pressure rotor disc unit in the gas turbine, such that the flange becomes a particularly critical component, with increasingly great difficulty in guaranteeing a service life which is adequate and in accordance with requirements, in particular in relation to the phenomena of creep or viscous creepage.

At present these connection flanges are produced according to a frusto-conical shape, with very small thicknesses, such as always to guarantee good compatibility with the rotor disc units which are connected to them.

However when the speeds of rotation and temperatures become high, the present connection flanges are subjected to particularly difficult operating conditions, especially in some areas of concentration of stress which, more specifically, are those which are close to the central axis and those in the area of coupling between the conical part and the outer ring of the connection flange.

The object of the present invention is thus to eliminate the aforementioned disadvantages and in particular that of providing an improved flange for connection between the axial compressor and high-pressure rotor disc unit in a gas turbine, which makes it possible to reduce the concentrations of stress; this therefore makes it possible to increase the speed of rotation and the compression ratios of the machines or to increase the temperature of the fluid, or to determine an appropriate combination of the two aspects.

Another object of the present invention is to provide an improved flange for connection between an axial compressor and high-pressure rotor disc unit in a gas turbine, which permits easy fitting and removal of the flange according to requirements.

A further object of the present invention is to provide an improved flange for connection between an axial compressor and a high-pressure rotor disc unit in a gas turbine, which is also highly reliable.

Another object of the present invention is to obtain a service life which is far longer than that which can be achieved at present with the connection flanges used.

Another object of the present invention is to provide an improved flange for connection between an axial compressor and a high-pressure rotor disc unit in a gas turbine, which is particularly simple and functional, has relatively low costs, and can be produced according to conventional processing operations.

These objects and others according to the present invention are achieved by producing an improved flange for connection between an axial compressor and a high-pressure rotor disc unit in a gas turbine as described in the independent claim 1.

Further characteristics of the improved flange for connection between an axial compressor and a high-pressure rotor disc unit in a gas turbine are indicated in the subsequent dependent claims.

According to the invention it has also been possible to determine that the reduction in the maximum stress values in the areas of concentration of the forces gives rise to a substantial increase in the service life of the flange.

In addition, the connection flange according to the invention can still be made of alloy steel, like the flanges according to the known art, and thus it can also be produced integrally with the shaft of the axial compressor of the gas turbine.

The characteristics and advantages of an improved flange for connection according to the present invention, between an axial compressor and a high-pressure rotor disc unit in a gas turbine will become clearer and more apparent from the following description provided by way of non-limiting example, with reference to the set of attached schematic drawings in which:

FIG. 2 is an enlarged cross-section of a detail of FIG. 1, which shows the connection flange according to the known art; and FIG. 3 is a cross-section which shows a connection flange produced according to the description of the present invention.

Figure 1:
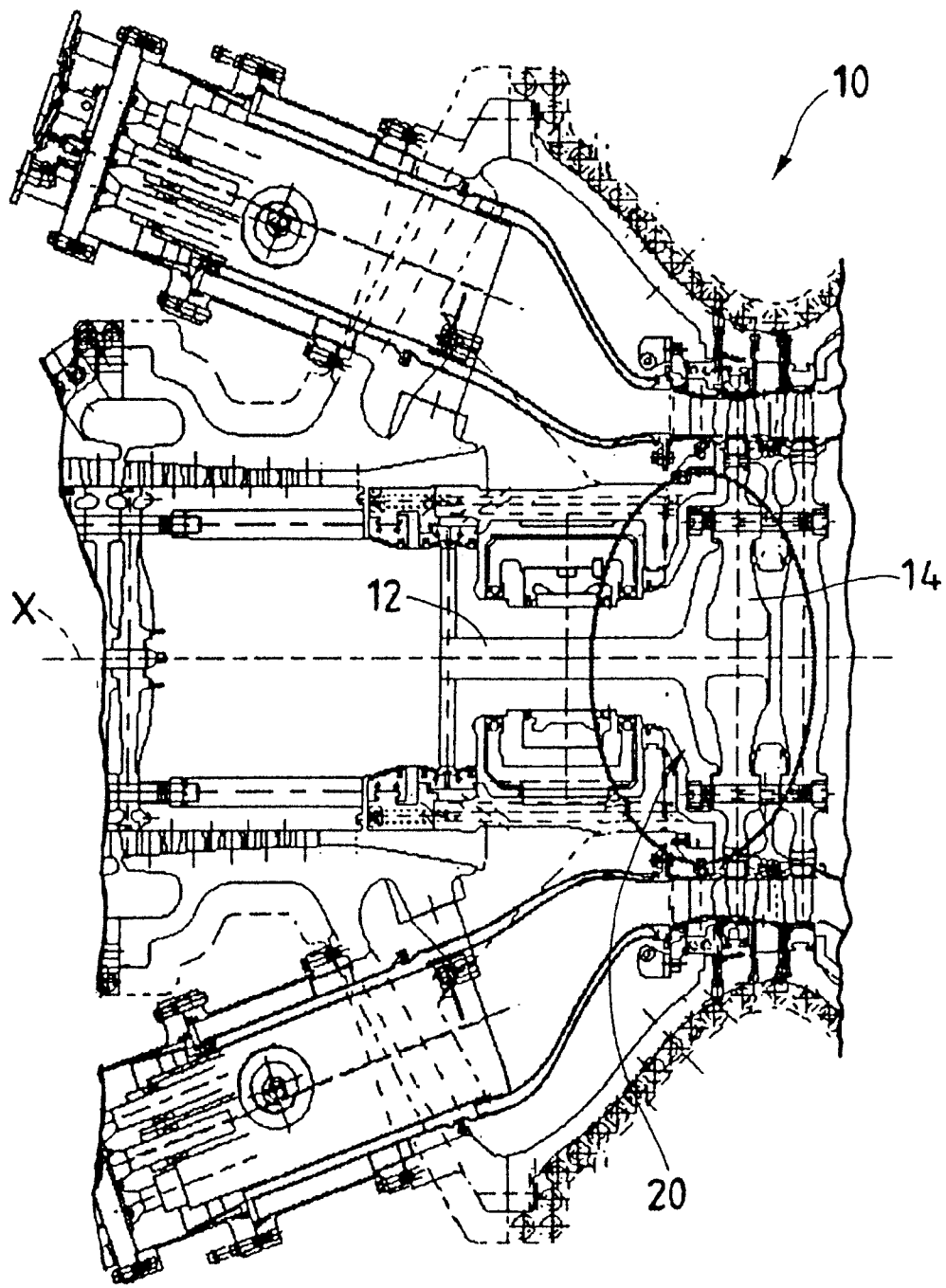
FIG. 1 is a cross-section of a gas turbine in which there can be seen a flange according to the known art, for connection between an axial compressor and a high-pressure rotor disc unit of the gas turbine.

FIG. 1 shows a gas turbine which is indicated as 10 as a whole, in which a rotary shaft 12 of an axial compressor, which rotates around a machine axis X, is connected to a high-pressure rotor disc unit 14 by means of a connection flange 20 produced according to the known art.

FIG. 2 shows the flange 20 which has a body 22 with a frusto-conical shape.

The frustum of the cone of the body 22 is joined to the shaft 12 of the axial compressor at its smaller base, by means of a cylindrical hub 24.

The join is created by means of securing elements or directly by producing the flange 20 integrally with the shaft 12 of the axial compressor.

The frustum of the cone of the body 22 is joined to the high-pressure rotor disc unit 14 at its larger base, by means of an extension 26 of the body 22 in the form of a circular ring, which extends radially towards the exterior in a direction at right-angles to the axis X.

The joint is produced by means of a circumferential recess 28 provided in a surface 29 of the extension 26 which faces the rotor disc unit 14. This recess 28 is connected for interference with a projection which is complementary to it provided on the rotor disc 14.

The join is completed by means of tie rods using through holes 30 provided in directions which are parallel to the axis of the machine X, along the extension 26, between the surface 29 and a surface 31 of the extension 26 which faces the axial compressor.

FIG. 3 shows a connection flange 20 produced according to the invention. Details are now given of the geometric variables which characterise the profile of the flange 20.

The hub 24 has a cylindrical shape, with an inner diameter $D_2$.

The frusto-conical body 22 has its outer generatrix inclined relative to the direction at right-angles to the axis X by an angle $\alpha_1$, whereas the inner generatrix has different inclination relative to the direction at right-angles to the axis X, and specifically of an angle $\alpha_2$.

The extension 26 ends in a diameter $D_5$ and has the circumferential recess 28 on the surface 29, at right-angles to the axis X, at a diameter $D_4$.

The outer generatrix is connected to the hub 24 by means of an arc of a circumference which has a radius $R_3$, in an area close to a diameter $D_3$.

On the other hand this outer generatrix is connected to the surface 31, at right-angles to the axis X, of the extension 26, by means of an arc to a circumference which has a radius $R_1$, in an area close to a diameter $D_1$.

The inner generatrix is coupled to the hub 24 by means of a bevel which is inclined according to an angle $\alpha_3$ relative to the axis X, in a direction Y.

On the other hand this inner generatrix is connected to the surface 29, at right-angles to the axis X, of the extension 26, by means of an arc of a circumference which has a radius $R_2$.

At the beginning of the extension 26, the body 22 also has a thickness $S_1$, measured at right-angles to the direction assumed by the outer generatrix of the frustum of the cone of the body 22 itself.

Finally, at its end, the extension 26 has a thickness $S_2$, measured in the direction of the axis X.

An analysis of the stresses relative to the connection flange 20 according to the present invention has made it possible to indicate an appropriate geometry which has permitted reduction of the concentrations of stress in the most critical areas of the body 22 of the flange 20, which are those close to the hub 24 and those in the area of coupling between the body 22 and the extension 26.

According to the invention, the most suitable geometry of the connection flange 20 is provided by a series of specific ratios between some of the aforementioned characteristic geometric variables.

The ratios between the radii $R_1$, $R_2$ and $R_3$, together with the diameters $D_1$, $D_2$, $D_3$, $D_4$ and $D_5$, the thickness $S_1$ and $S_2$ and the angles $\alpha_1$, $\alpha_2$ and $\alpha_3$ must be considered fundamental.

In fact these ratios determine the improved geometric form of the connection flange 20 according to the present invention, from the hub 24 to the extension 26.

It has thus been determined according to the present invention that the connection flange 20 is optimised if the following ratios exist:

the ratio between $R_2$ and $R_1$ is between 0.8 and 1, including extreme values;

the ratio between $R_2$ and $R_3$ is between 3.5 and 4.5, including extreme values;

the ratio between $D_4$ and $D_5$ is between 0.7 and 0.85, including extreme values;

the ratio between $D_4$ and $D_3$ is between 1.55 and 1.7, including extreme values;

the ratio between $D_4$ and $D_2$ is between 5.2 and 6.5, including extreme values;

the ratio between $D_4$ and $D_1$ is between 0.95 and 1.05, including extreme values;

the ratio between $S_1$ and $D_4$ is between 0.13 and 0.18, including extreme values;

the ratio between $S_2$ and $D_4$ is between 1.3 and 1.7, including extreme values.

As can be seen, the last six ratios take as a reference the diameter $D_4$.

Simultaneously, the following ratios must exist for the angles:

the angle $\alpha_1$ is between 25° and 35°, including extreme values;

the angle $\alpha_2$ is between 12° and 18°, including extreme values;

the angle $\alpha_3$ is between 26° and 34°, including extreme values.

To summarise, the characteristics on which the improved connection flange according to the present invention are based are the angles of the two generatrices of the frusto-conical body and the said combination between the radii of the arcs of circumference of connection.

The description provided makes apparent the characteristics of the improved flange which is the subject of the present invention, for connection between an axial compressor and high-pressure rotor disc unit in a gas turbine, as well as the corresponding advantages, which, it will be noted, include:

a substantial increase in the service life of the connection flange, since the maximum values of the stresses in the areas of concentration of the forces have been reduced;

an increase in the speed of rotation and compression ratios of the machines, or increase in the temperature of the fluid, or determination of a suitable combination of the two aspects;

easy fitting and dismantling in maintenance operations;

a high level of reliability; and low costs compared with the known art, since, in order to obtain the connection flange according to the invention, no processing different from that carried out at present is required; in particular, the flange can still be made of alloy steel, and, as is already the case for the flanges according to the known art, it can also be produced integrally with the axial compressor shaft of the gas turbine.

Finally it is apparent that many modifications and variations, all of which come within the scope of the invention, can be made to the improved flange thus designed for connection between an axial compressor and high-pressure rotor disc unit in a gas turbine.

In addition all the details of the connection flange according to the invention can be replaced by elements which are technically equivalent.

In practice any materials, forms and dimensions can be used, according to the technical requirements.

The scope of protection of the invention is thus delimited by the attached claims.

What is claimed is:

1. A flange for connection between an axial compressor and a high-pressure rotor disc unit in a gas turbine, said flange including a body having a frusto-conical shape, said body being joined to a shaft rotatable about a machine axis of said axial compressor by a hub having a cylindrical shape, said body being joined at a larger base of the frusto-conically-shaped body to said rotor disc unit by an extension of the hub in the form of a circular ring, said extension having a circumferential recess provided in a surface of said extension facing said rotor disc unit for connecting by interference with a projection complementary to the recess and provided on the rotor disc unit, said frusto-conically-shaped body having an outer generatrix inclined relative to a direction at right angles to the machine axis by an angle $\alpha_2$ between 25° and 35°, said frusto-conical body having an inner generatrix inclined relative to the direction at right angles to the machine axis by an angle $\alpha_2$ between 12° and 18°.

2. A flange according to claim 1 wherein said extension extends radially towards an exterior of said body in a direction at right angles to the machine axis and terminates in a diameter $D_5$, said surface of said circumferential recess extending at right angles to the axis (X) at a diameter $D_4$, the ratio between diameters $D_4$ and $D_5$ being between 0.7 and 0.85.

3. A flange according to claim 2 wherein said extension is connected to two inner and outer generatrices of the frusto-conical body, respectively, according to arcs of circumferences with radii $R_2$ and $R_1$, respectively, the connection with the outer generatrix being formed to a diameter $D_1$ relative to the machine axis (X), the ratio between radii $R_2$ and $R_1$ being between 0.8 and 1 and the ratio between diameters $D_4$ and $D_1$ being between 0.95 and 1.05.

4. A flange according to claim 3 wherein said hub is connected to the outer generatrix of the frusto-conical body along an arc of circumference with a radius $R_3$, the connection with the outer generatrix being formed in an area close to a diameter $D_1$ relative to the machine axis (X), the ratio between $R_2$ and $R_3$ being between 3.5 and 4.5, and the ratio between $D_4$ and $D_3$ being between 1.55 and 1.7.

5. A flange according to claim 2 wherein, at an end of the extension, said body has a thickness $S_1$, measured at right angles to the direction assumed by the outer generatrix of the frusto-conically-shaped body, and, at the opposite end of said extension, said flange having a thickness $S_2$ measured in the direction of the machine axis (X), the ratio between $S_1$ and $D_4$ being between 0.13 and 0.18, and the ratio between $S_2$ and $D_4$ being between 1.3 and 1.7.

6. A flange according to claim 1 wherein the inner generatrix of the frusto-conical body is coupled to the hub in a direction (Y), which, relative to the machine axis (X), forms an angle $\alpha_3$ of between 26° and 34°.

7. A flange according to claim 2 wherein said hub has a cylindrical shape and an inner diameter $D_2$, the ratio between $D_4$ and $D_2$ being between 5.2 and 6.5.

8. A flange according to claim 1 characterized in that said extension has a series of circumferential through holes extending in directions parallel to the machine axis (X), between said surface and a surface of the extension facing said axial compressor, said through holes receiving elements for securing between said flange and said rotor disc unit.

9. A flange according to claim 8 wherein said elements comprise tie rods.

* * * * *

UNITED STATES PATENT AND TRADEMARK OFFICE
CERTIFICATE OF CORRECTION

PATENT NO.     : 6,672,630 B2
DATED          : January 6, 2004
INVENTOR(S)    : Pinzauti et al.

It is certified that error appears in the above-identified patent and that said Letters Patent is hereby corrected as shown below:

<u>Column 3,</u>
Line 55, "are of a circumference" should read -- arc of a circumference --.

Signed and Sealed this

Twenty-fourth Day of February, 2004

JON W. DUDAS
*Acting Director of the United States Patent and Trademark Office*